Patented Jan. 14, 1941

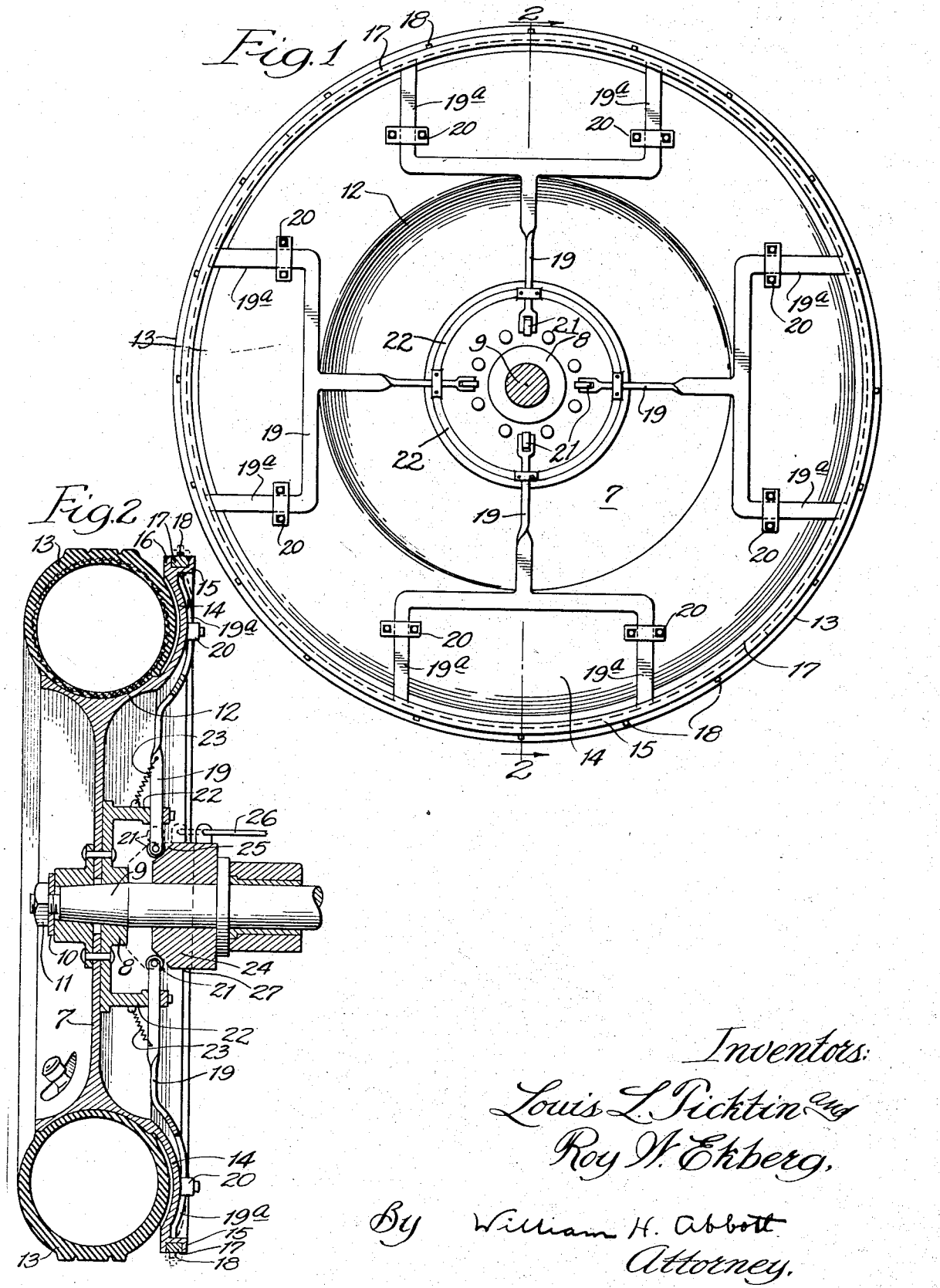

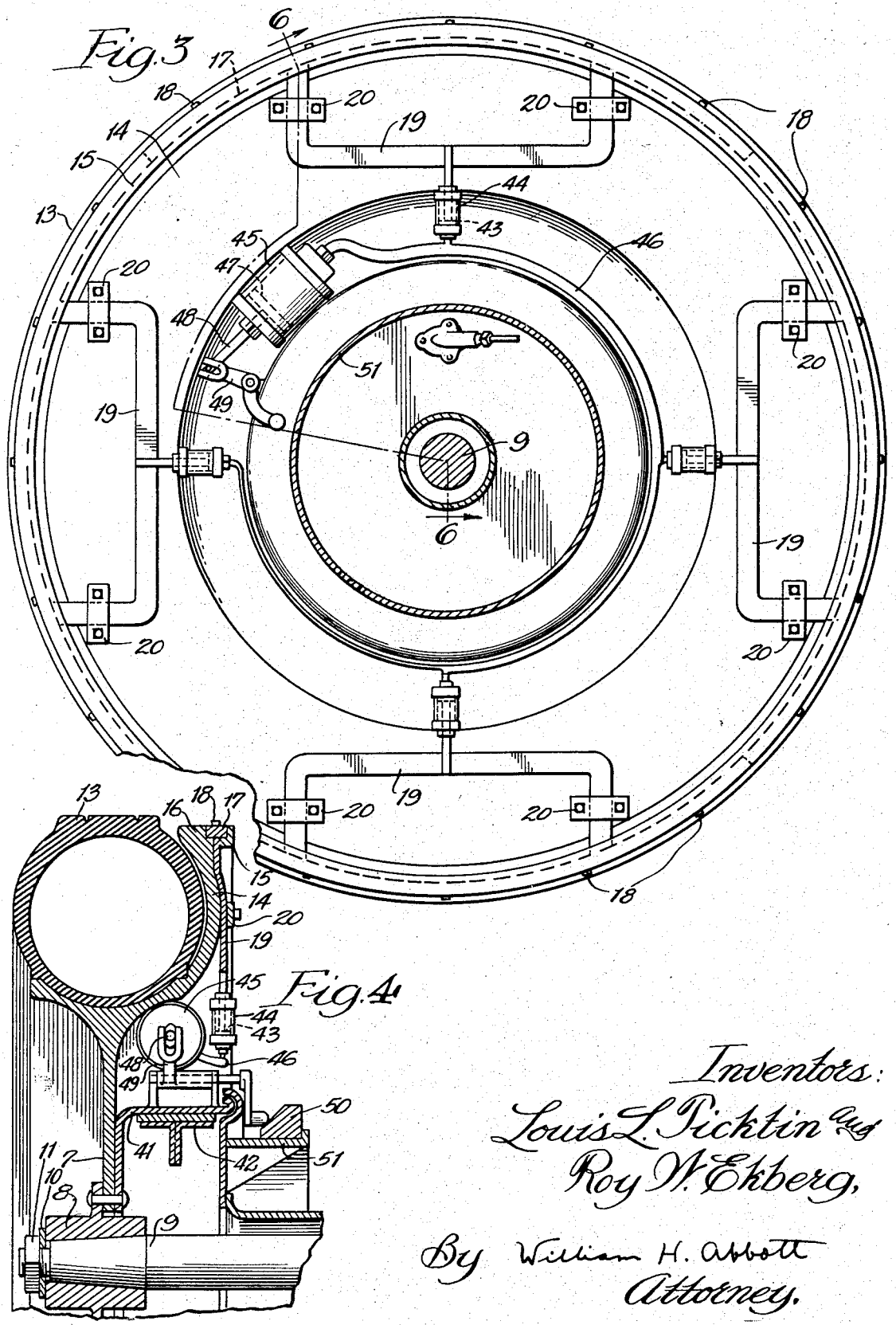

2,228,423

UNITED STATES PATENT OFFICE 2,228,423

WHEEL

Louis L. Ticktin, Evanston, and Roy W. Ekberg, Chicago, Ill.

Application August 27, 1937, Serial No. 161,193

2 Claims. (Cl. 301—47)

This invention relates to wheels and more particularly to wheels for automobiles and airplanes.

The invention broadly contemplates the provision of a wheel including a rim having an extension lying inside the outer surface of the tire carried on the rim. The rim extension is of such strength that it is adapted to carry the normal load borne by the wheel in case the tire is deflated.

It is well recognized that a considerable number of automobile accidents and fatalities resulting therefrom occur because of the sudden deflation of the oversize tires currently employed upon motor vehicles and the frequent upsetting or loss of control of the vehicle resulting therefrom. An object of the invention, therefore, is the provision of a wheel having an extended rim which will support the vehicle upon deflation of the tire.

A further object is the provision of means for preventing injury to the casing of a pneumatic tire should it become deflated when in use, and, therefore, the provision of an emergency support for the vehicle to relieve the pneumatic casing of the weight of the vehicle.

A feature of the invention is the provision of a wheel having a prolonged flange portion whereby, in the event that a pneumatic tire carried on the wheel becomes deflated, the vehicle can proceed without damage to the deflated tire until such time as it may be convenient to repair the tire.

A further object of the invention is the provision of means, carried by an extension of the rim of a wheel, for gripping slippery road surfaces or streets. This feature of the invention is particularly important in latitudes where the roads and streets are frequently covered with snow and ice during the winter season. Briefly, this feature of the invention contemplates the provision of means adapted to protrude through the extended portion of the rim and controllable by the driver or other occupant of the vehicle.

The invention will be readily understood from the following description in conjunction with the accompanying drawings wherein certain preferred embodiments are shown, in which:

Fig. 1 is a side elevation of a preferred embodiment of the invention;

Fig. 2, a sectional view taken along lines 2—2 of Fig. 1;

Fig. 3, a side elevation of a further modification; and

Fig. 4, a fragmentary sectional view along lines 6—6 of Fig. 5.

Referring to the embodiment shown in Figs. 1 and 2, the reference character 7 indicates a wheel which may be of the drop center, disc, wire or spoke type. The wheel is provided with a hub 8 mounted upon the axle 9 and secured thereon by a collar 10 and bolt 11. The wheel is provided with a rim 12 adapted to retain a pneumatic tire 13; one flange 14 of the rim is radially extended to within 1½" of the outer circumference of the tire and is of a concavo-convex shape to conform to the curvature of the tire and is preferably positioned adjacent thereto when the tire is inflated. The extension 14 terminates in a bead or flange 15 adapted to engage the surface of the road or street upon deflation of the tire, and the rim extension is of such strength that it will support the load normally carried by the tire.

The radial flange 15 is provided with an annular centrally disposed groove 16 adapted to house a plurality of arcuate metallic strips 17. A plurality of equally spaced lugs 18 are fixedly secured to and project outwardly from the surface of the segment-strips 17. The surface of the lugs 18 may be roughened to afford a gripping surface. In the embodiment shown in Figs. 1 and 2, four segmental strips are employed, but it is to be understood that the number of strips, as well as the number of lugs, may be varied. Furthermore, the lugs 18 may be removably secured to strips 17 by being screwed therein.

The strips 17 normally rest in the base of groove 16. Rods 19, having a bifurcated portion 19a, are secured to the base of strips, extending through slots in the flange 15 and are adapted to move the strips and the lugs carried thereby outwardly so that the lugs extend slightly beyond the outer circumference of the tire. The rods 19 are curved to conform to the shape of the annular extension 19, and are preferably formed of steel or other suitable material which will not buckle when they are subjected to radial pressure. Straps 20, suitably secured to the rim extension 14, slidably retain the bifurcated portions of rods 19 in position. The inner ends of the rods 19 are provided with rollers 21. An annular flange 22, extending upwardly and outwardly from the hub 8, is provided with slots in which the lower ends of the rods 19 are slidably retained. Coil springs 23, secured to the flange portion 22 and fixed to a central portion of the rods 19, yieldingly urge said rods toward the hub of the wheel.

A trunnion 24 having an outer beveled edge 25 is slidably journaled on the axle 9 and in its outermost position bears against the inner edge of the hub 8. A control arm 26 is fixedly secured to the trunnion 24 and is connected by levers (not shown) to a foot pedal or rod protruding from the floor board or instrument panel of the automobile, conveniently disposed to the operator of the vehicle. The trunnion is normally disposed in the position shown in Fig. 2 in which the rollers 21 carried by the rod bear against the beveled edge 25. Upon being slided to its outer position, indicated in dotted lines, the trunnion acts as a cam, and the rods 19 are pushed outwardly as the rollers 21 are forced to the outer periphery 27 of the trunnion. In this position it will be readily seen that the strips 17 are forced out of groove 16, and the lugs 18 extend slightly beyond the outer circumference of the tire 13, and that a firm support is provided for the strips 17 adapted to withstand the radial pressure encountered when the lugs engage the road surface. It will be understood that lugs may be extended to aid in starting or stopping the vehicle or may be left in the extended position for longer periods when an icy pavement must be traversed. When the trunnion is slided to its normal innermost position, spring 23 urges the rods 19 to their retracted positions. The improved wheel is preferably employed on all four axles of the car and is designed in such manner that the gripping device does not interfere with the braking mechanism of the vehicle.

In the embodiment shown in Figs. 3 and 4, the surface-gripping members are adapted to be set in operative position by direct adjustment from outside of the vehicle. In this embodiment, the rim extension 30 of the improved wheel terminates in a flared-out portion 31 provided with a plurality of threaded bores 32. Lugs 33 having threaded portions 34 are housed in the bores 32 and may be screwed to a gripping position where they protrude slightly above the outer periphery of the tire when a slippery pavement is to be traversed.

In the embodiment of Figs. 3 and 4 the arcuate strips 17 carrying surface-gripping lugs 18 are extended from the grooved flange 15 of the rim extension 14 by hydraulic mechanism. The actuating mechanism is shown housed outside of the braking device, of which are shown a brake drum 41 and a brake shoe 42.

The bifurcated rods 19 secured to strips 17 terminate in plungers 43 suitably housed in fluid-containing cylinders 44. The cylinders 44 are connected to a master cylinder 45 by line 46. Plunger 47, carried on the rod 48, is housed in the master cylinder 45. The rod 48 is pivotally connected to a bell crank 49 which may be pivotally mounted on the outer surface of brake drum 41. A cam member 50, slidably carried on a flange 51 secured to the brake housing, is adapted to pivot the bell crank 49 when the cam is pushed outwardly, thereby moving the plunger 47 into the cylinder 45, forcing the fluid from the cylinder 45 into line 46, and urging the subsidiary plungers 43 and rods 19 outwardly to extend the strip 17 and the gripping lugs carried thereon. The cam member 50 is actuated by levers (not shown) controlled from the floor board or instrument panel of the vehicle. It will thus be seen that we have provided hydraulically-operated mechanism carried outside the braking system and adapted to extend the lugs 18 into road-gripping position.

Having thus described our invention and illustrated its use, what we claim as new and desire to secure by Letters Patent is:

1. In a vehicle wheel provided with a tire carrying rim, an annular inner extension of said rim terminating within the outer circumference of said tire, disposed adjacent to and curved to conform to the curve of said wall of said tire and adapted to support the load normally carried by said tire in the event of deflation thereof, the outer end of said rim extension being provided with a channeled flange member, arcuate strips housed in said annular channeled member, surface gripping lugs carried on the outer surface of said strips, said lugs being normally positioned within the outer surface of said tire and being adapted to be protracted beyond the outer surface of said tire, rods secured to said strips and slidable radially along said wheel, and means, including a cam, for moving said rods toward and away from the outer circumference of said tire.

2. In a vehicle wheel provided with a tire carrying rim, an annular extension of said rim on the inner side of said wheel terminating within the outer circumference of said tire, said extension being disposed adjacent to the side wall of said tire and adapted to support the load normally carried by said tire in the event of deflation thereof; the outer end of said rim extension being provided with a shoulder member, said shoulder member having a substantially flat channeled circumference, arcuate strips housed in said channeled circumference, surface gripping lugs carried on the outer surface of said strips, said lugs being normally positioned within the outer circumference of said tire and being adapted to be protracted beyond the outer circumference of said tire, bifurcated rods secured to said strips and slidable radially along said wheel, and means, including a cam, for moving said rods outwardly.

LOUIS L. TICKTIN.
ROY W. EKBERG.